Patented Nov. 1, 1938

2,135,448

UNITED STATES PATENT OFFICE 2,135,448

ORGANIC ACID SYNTHESIS

Donald J. Loder, Wilmington, Del., assignor to E. I. du Pont de Nemours & Company, Wilmington, Del., a corporation of Delaware No Drawing. Application December 13, 1935, Serial No. 54,326

21 Claims. (Cl. 260—532)

This invention relates to a process for the preparation of aliphatic organic acids and more particularly to a process for the preparation of acetic acid and esters thereof by the interaction of methanol with carbon monoxide in the presence of a condensing agent.

An object of the present invention is to provide an improved process for the preparation of organic acids and their esters from methanol and carbon monoxide by condensing them in the presence of a highly active condensing agent. Another object of the invention is to provide a process wherein acetic acid is prepared from methanol and carbon monoxide in the presence of a condensing agent which is readily recovered and used over and over again in the synthesis. A still further object of the invention is to provide a stepwise process wherein the methanol is reacted with a boron halide catalyst to form an addition compound, that compound is then reacted with carbon monoxide to form an addition compound between acetic acid and the boron halide, the acetic acid being recovered from the addition compound by various processes.

Other objects and advantages of the invention will hereinafter appear.

I have found that acetic acid can be obtained in good yield from carbon monoxide and an addition compound of methanol and a boron halide by the following series of steps. Methanol and boron fluoride are reacted to form an addition compound of the methanol and the boron fluoride. This addition compound is condensed with carbon monoxide to give an addition compound of acetic acid with boron fluoride. This product is distilled driving off the excess of boron fluoride and leaving approximately two mols of acetic acid per mol of boron fluoride and by further treatment the acetic acid may be separated from the boron fluoride.

The acetic acid-boron fluoride addition compound may be broken up by adding thereto an alkaline earth halide such as calcium fluoride which forms an addition compound with the boron fluoride setting free the acetic acid. By distillation the acetic acid is distilled from the newly formed addition compound. This addition compound may be subsequently strongly heated whereupon the boron fluoride is driven off leaving the calcium fluoride.

Alternatively the acetic acid-boron fluoride addition compound may be separated by differential distillation. This distillation process involves subjecting the acetic acid-boron fluoride compound, containing approximately two mols of acetic acid per mol of boron fluoride, to vacuum distillation wherein a portion of the acetic acid is driven off leaving as a residue a product containing approximately 1.5 mols of acetic acid per mol of boron fluoride. When the ratio of acid to halide is obtained distillation is repeated at atmospheric or greater pressures, and the boron fluoride is driven off leaving as a residue an addition compound containing approximately 2 mols of acid per mol of boron fluoride. Thus by repeated distillations under pressure and vacuum substantially complete separation of the acid from the boron fluoride is possible.

As the starting material may be an addition compound of methanol with boron fluoride it is of advantage in the purification stages to pass the boron fluoride evolved during the pressure distillation stage directly into methanol to form the addition compound. By this procedure the highly corrosive, highly toxic boron fluoride gas will exist but a very short period of time in the uncombined state. The addition compound so formed may be used to offset a portion of the raw materials required.

Other condensing agents which will form addition compounds with methanol may be employed although generally I prefer to use compounds containing boron and fluorine and more particularly boron fluoride. Other condensing agents may be used such, for example, as dihydroxy fluoboric acid, borofluohydric acid, and the oxygenated acids obtained by mixtures of boric acids and borates with hydrogen halides, such as hydrofluoric, hydrochloric and hydriodic acid. An exceptionally useful catalyst is obtained by having a small amount say from 1 to 10% of dihydroxy fluoboric acid or borofluohydric acid present with boron trifluoride (the amount being based on the boron halide).

Not only can an addition compound of methanol and a boron halide be condensed in the presence of carbon monoxide to acetic acid or the reaction product of the acetic acid with methanol, i. e. methyl acetate, but the higher alcohols, and particularly normal alcohols, such as ethyl alcohol, propyl alcohol, butyl alcohol and the higher molecular weight alcohols, such, for example, as hexyl alcohol or octyl alcohol, may be similarly converted. Analogous addition compounds of the secondary and tertiary alcohols such as isobutyl alcohol, tertiary butyl alcohol and the like may be reacted but usually the reaction does not proceed as cleanly with these alcohols, for many side products are produced along with the acids. The process is likewise applicable to the preparation of the polycarboxylic acids from the polyhydroxy alcohols such as 1.3 propylene glycol, decamethylene glycol, tetrahydrofurane and the like. In lieu of the alcohol addition compounds, similar compounds formed from boron halides and compounds which hydrolyze to form alcohols may likewise be used such, for example, as ethers, esters and the like; acids being readily obtained, e. g. by the condensation of carbon monoxide with an addition compound of boron fluoride with dimethyl ether, diethyl ether, methyl formate, methyl acetate, etc. When employing compounds which hydrolyze to form alcohols it is desirable to have sufficient water present to effect the hydrolysis. The water may be present as such, as a complex with the boron halogen containing compound or in any other suitable form.

The ratio of the boron halide to the methanol or other compound is not particularly critical. For example it has been found that an addition compound having from one to five mols of the alcohol per mol of the halide will react with carbon monoxide to form acids and/or esters. With other compounds similar ratios of the boron halide to the compound may be used.

The synthesis can generally be efficiently carried out under the following operating conditions. The pressure may vary from atmospheric pressures up to 1000 atmospheres or even more. Generally, it appears preferable to operate in the neighborhood of from 350 to 700 atmospheres although pressures above 5 atmospheres are in many instances satisfactory. The temperature within the reaction zone is not particularly critical for, with the highly efficient condensing agent used, the reaction will proceed from room temperature up to approximately 350° C. I prefer, however, to operate within the range of from 180 to 275° C., under which temperature conditions side reactions are minimized.

The carbon monoxide used may be obtained from various commercial sources, such, for example, as water gas, producer gas, coke oven gas, and the like, but to obtain products of the highest degree of purity it is preferable to remove from such commercial gases the objectionable constituents such as sulphur compounds, metal carbonyls, etc.

Furthermore, inert gases may be present in the carbon monoxide used and they are, in some respects desirable. Nitrogen, for example, has, it appears, little deleterious effect on the reaction or yield and, in fact may be used to advantage in order to aid in the agitation of the alcohol-boron fluoride addition compound, particularly if the carbon monoxide is bubbled into that compound. Other strictly inert gases behave similarly to nitrogen.

I shall describe specific embodiments of my process but it will be understood that the details therein and the compounds employed, will not restrict the scope of the invention, but merely illustrate methods by which my process can be carried out.

*Example 1.*—Into a pressure resisting autoclave provided with suitable heating and cooling means there are passed methanol and boron trifluoride in the ratio of 96 parts by weight to 68 parts by weight respectively. An addition compound between the methanol and boron trifluoride results and into 225 parts by weight of the resulting product carbon monoxide is injected under a pressure between 800 and 900 atmospheres and at a temperature of approximately 250° C. The reaction is continued under these conditions for approximately 1 hour. The carbon monoxide is rapidly absorbed which is evidenced by a pressure drop. The reaction product contains free methyl acetate and an acetic acid-boron trifluoride addition compound which in a particular synthesis showed 7.3% of free ester and 60% of the acid addition compound based on the methanol used. The product may be heated to drive off the low boiling ester leaving as a residue an acetic acid-boron fluoride addition compound in the ratio of 2 mols of acetic acid per mol of boron fluoride. This product may be separated into acid and halide by either of the following methods.

A. 45 parts by weight of calcium fluoride was added to 188 parts by weight of the acetic acid addition compound $(CH_3COOH)_2.BF_3$ of Example 1 in a flask attached to a short fractionation column. The mixture was heated in an oil bath to not more than 250° C., during which the acetic acid distilled out.

B. If desired the acetic acid boron trifluoride addition compound may be decomposed into its constituents by differential pressure distillation. The addition compound containing approximately 2 mols of the acetic acid to 1 mol of the boron trifluoride is subjected to a pressure of approximately 15 mm. and is then subjected to distillation whereupon approximately 16% of the acetic acid present is distilled over. The pressure is increased to atmospheric pressure or higher and the mixture heated, approximately 15% of the boron trifluoride present is now driven off. The pressure is again lowered and 10% of the acetic acid originally present distills over. A second increase in pressure and further heating drives off an additional 10% of the boron fluoride. Additional distillations and heatings give off 10% each of acid and boron fluoride, the percentage being based on the amount originally present.

By thus alternately distilling under reduced pressure and then under atmospheric or higher pressures the addition compound can be broken up into the halide and the acid.

*Example 2.*—1.9 mols of ethanol, $BF_3$ addition compound obtained by interacting equal molal quantities of ethanol with anhydrous $BF_3$ was heated up to 185° C., and held between 185 to 190° C., for approximately ¾ of an hour under a carbon monoxide atmosphere of from 800 to 900 atmospheres. A pressure drop, indicating absorption, of 595 atmospheres occurred. After lowering the pressure and temperature the product upon being analyzed showed a 60% yield of propionic acid as the propionic acid—$BF_3$ addition compound. The propionic acid can be separated from this addition compound by the differential pressure process or the calcium fluoride process described in Example 1.

*Example 3.*—A high pressure, silver lined autoclave was charged with 163.5 parts by weight $Et_2O.BF_3$ and 98.9 parts by weight $HOH.BF_3$. Under an initial carbon monoxide pressure of 575 atmospheres the autoclave, in a shaker machine, was heated to 170° C. Gas absorption began to take place at 158° C. The pressure was thereafter maintained at 800 atmospheres. At the end of 29 minutes at temperature, a pressure drop of 610 atmospheres had occurred. The crude product had increased 43.6 parts by weight. Fractionation of the crude product, during which diethyl ether was constantly added, yielded 141.4 parts by weight of propionic acid-boron fluoride complex, which is equivalent to 51.8% of the theoretical yield based on the ethyl ether charged.

From a consideration of the above specification it will be realized that many changes may be made in the manner of obtaining the ester and acid from an alcohol and carbon monoxide without departing from the scope of this invention or sacrificing any of its advantages.

I claim:

1. In a liquid phase process for the preparation of acetic acid the steps which comprise reacting methanol with boron trifluoride to form an addition compound containing approximately two mols of methanol per mol of boron trifluoride, and subsequently reacting the resulting product with carbon monoxide.

2. In a liquid phase process for the preparation of propionic acid the steps which comprise reacting ethanol with boron trifluoride to form an addition compound containing approximately two mols of ethanol per mol of boron trifluoride, and subsequently reacting the resulting product with carbon monoxide.

3. A process for the preparation of acetic acid which comprises interacting methanol with boron trifluoride in the ratio of 98 parts of methanol to 68 parts of boron trifluoride, reacting the resulting compound with carbon monoxide at a pressure of 800 to 900 atmospheres and a temperature of approximately 250° C., and separating from the resulting product the acetic acid produced.

4. A process for the preparation of aliphatic organic acids which comprises forming a complex between an alcohol and boron fluoride and subsequently contacting the resulting complex with carbon monoxide at a temperature between 180 to 350° C.

5. The process of claim 4 conducted at an elevated pressure not exceeding approximately 1,000 atmospheres.

6. A process for the preparation of acetic acid which comprises forming a complex between 1 to 5 mols of methanol and 1 mol of boron fluoride and subsequently contacting the resulting complex with carbon monoxide at a temperature of from 180 to 350° C.

7. A process of reacting an alcohol and boron fluoride to form a complex, and subsequently reacting the thus formed complex with carbon monoxide and thereby obtaining an aliphatic organic acid.

8. A process of reacting methanol and boron fluoride to form a complex, and subsequently reacting the thus formed complex with carbon monoxide and thereby obtaining acetic acid.

9. In a liquid phase process for the preparation of an organic acid the steps which comprise forming an addition compound between a boron halide and a compound selected from the group consisting of monohydric aliphatic alcohols and compounds which form monohydric aliphatic alcohols upon hydrolysis and subsequently reacting the resulting addition compound with carbon monoxide in the presence of water.

10. The process of claim 9 in which the boron halide is boron trifluoride.

11. In a liquid phase process for the preparation of an organic acid the steps which comprise forming an addition compound between boron trifluoride and a compound selected from the group consisting of monohydric aliphatic alcohols and compounds which form monohydric aliphatic alcohols upon hydrolysis and subsequently reacting the resulting addition compound with carbon monoxide in the presence of water at a temperature not exceeding 350° C., and a pressure between 350 and 700 atmospheres.

12. In a liquid phase process for the preparation of an organic acid the steps which comprise forming an addition compound between a boron halide and a compound selected from the group consisting of monohydric aliphatic alcohols and compounds which form monohydric aliphatic alcohols upon hydrolysis, the addition compound containing per mol of the boron halide not appreciably more than five mols of the compound selected from the group, and subsequently reacting the resulting addition compound with carbon monoxide in the presence of water.

13. The process of claim 12 in which the boron halide is boron trifluoride.

14. In a liquid phase process for the preparation of an organic acid the steps which comprise forming an addition compound between boron trifluoride and a compound selected from the group consisting of monohydric aliphatic alcohols and compounds which form monohydric aliphatic alcohols upon hydrolysis, the addition compound containing per mol of the boron trifluoride two mols of the compound selected from the group, and subsequently reacting the resulting addition compound with carbon monoxide in the presence of water.

15. In a liquid phase process for the preparation of an organic acid the steps which comprise forming an addition compound between boron trifluoride and a compound selected from the group consisting of monohydric aliphatic alcohols and compounds which form monohydric aliphatic alcohols upon hydrolysis, the addition compound containing per mol of the boron trifluoride three mols of the compound selected from the group and subsequently reacting the resulting addition compound with carbon monoxide in the presence of water.

16. In a liquid phase process for the preparation of acetic acid the steps which comprise forming an addition compound between a boron halide and a compound selected from the group consisting of methanol and compounds which form methanol upon hydrolysis, and subsequently reacting the resulting addition compound with carbon monoxide in the presence of water.

17. In a liquid phase process for the preparation of acetic acid the steps which comprise forming an addition compound between a boron fluoride and a compound selected from the group consisting of methanol and compounds which form methanol upon hydrolysis, and subsequently reacting the resulting addition compound with carbon monoxide in the presence of substantial amounts of water at elevated temperatures and pressures.

18. In a liquid phase process for the preparation of acetic acid the steps which comprise forming an addition compound between boron trifluoride and a compound selected from the group consisting of methanol and compounds which form methanol upon hydrolysis, and subsequently reacting the resulting addition compound with carbon monoxide in the presence of substantial amounts of water at a temperature between 180° C. and 275° C. and a pressure between 350 and 700 atmospheres.

19. In a liquid phase process for the preparation of acetic acid the steps which comprise forming an addition compound between boron trifluoride and a compound selected from the group consisting of methanol and compounds which form methanol upon hydrolysis, the addition compound containing per mol of the boron trifluoride not appreciably more than five mols of the compound selected from the group, and subsequently reacting the resulting addition compound with carbon monoxide in the presence of water.

20. In a liquid phase process for the preparation of an organic acid the steps which comprise forming an addition compound between boron trifluoride and a compound which forms a monohydric aliphatic alcohol upon hydrolysis, the addition compound containing per mol of the boron trifluoride two mols of the alcohol-forming compound, and subsequently reacting the resulting addition compound with carbon monoxide in the presence of water.

21. In a liquid phase process for the preparation of acetic acid the steps which comprise forming an addition compound between boron trifluoride and a compound which forms methanol upon hydrolysis, the addition compound containing per mol of the boron trifluoride three mols of the methanol-forming compound, and subsequently reacting the resulting addition compound with carbon monoxide in the presence of water.

DONALD J. LODER.